United States Patent
Albouy et al.

[11] Patent Number: 5,847,815
[45] Date of Patent: Dec. 8, 1998

[54] MONOSTATIC LIDAR SYSTEM

[75] Inventors: Patrice Albouy, Issy Les Moulineaux; Valérie Grolier, Paris; Paul Thibout, Guyancourt, all of France

[73] Assignee: Thomson-CSF, Paris, France

[21] Appl. No.: 954,227

[22] Filed: Oct. 20, 1997

[30] Foreign Application Priority Data

Oct. 22, 1996 [FR] France ................................. 96 12802

[51] Int. Cl.$^6$ ................. G01C 3/08; G01P 3/36; G02F 1/03; G02F 1/29
[52] U.S. Cl. .................. 356/4.01; 356/28; 356/28.5; 359/241; 359/244; 359/299
[58] Field of Search ............. 356/4.01, 28, 28.5; 359/241, 244, 299

[56] References Cited

U.S. PATENT DOCUMENTS

| | | |
|---|---|---|
| 4,283,113 | 8/1981 | Eden . |
| 4,528,525 | 7/1985 | Eden et al. . |
| 4,615,619 | 10/1986 | Fateley . |
| 5,095,384 | 3/1992 | DeNatale . |
| 5,208,698 | 5/1993 | Muller ................................. 359/299 |

OTHER PUBLICATIONS

C. M. Lawson, et al., "Nonlinear Reflection at a Dielectric–Carbon Suspension Interface: Macroscopic Theory and Experiment", Applied Physics Letters, vol. 64, No. 16, Apr. 18, 1994, pp. 2081–2083.

*Primary Examiner*—Stephen C. Buczinski
*Attorney, Agent, or Firm*—Oblon, Spivak, McClelland, Maier & Neustadt, P.C.

[57] ABSTRACT

This monostatic LIDAR system is a pulsed-radiation LIDAR system comprising, for the separation of the laser emitter beam from the laser echo backscattered by the photodetector of the receiver, an optical separator that deflects an incident light beam in different directions, depending on whether it transmits or reflects this beam, the coefficient of transmission or the coefficient of reflection of this optical separator varying as a function of the energy density of said incident light beam. Advantageously, this optical separator is constituted by a layer of vanadium dioxide $VO_2$ deposited on a transparent plate. An optical separator of this kind is used to obtain a total transmission/reception output greater than that of an optical separator with semi-reflective plate while, at the same time, preserving the advantages that an optical separator of this kind brings about in the optical architecture of a LIDAR, these advantages being simplicity, easy setting, compactness and low-level parasitic reflections.

6 Claims, 1 Drawing Sheet

MONOSTATIC LIDAR SYSTEM

BACKGROUND OF THE INVENTION

1. Field of the Invention

The present invention relates to monostatic LIDAR (LIght Detection And Ranging) type laser-based active optronic systems. These systems possess the following, assembled at one and the same site: a laser emitter illuminating a scene to be explored with a light beam and a receiver with photoelectric detector analyzing the laser echo backscattered by the scene. Such systems which can provide indications on the distance, speed and reflectance of a target, have a wide variety of uses, for example in telemetry, active imaging, the detection of pollutants and optronic countermeasures.

One of the essential constraints of monostatic LIDAR type laser-based active optronic systems is that the light beam from the laser emitter, whose peak power can reach several million watts, must be separated from the backscattered laser echo to be conveyed to the photodetector-based receiver whose power may be lower than a few tens of nanoWatts. This separation between the emission and reception light beams must be done with the least possible losses in order to enable the laser emitter to emit a maximum luminous flux and to enable the photoelectric detector of the receiver to receive a maximum luminous flux from the laser echo. The quality of the separation obtained is assessed by the value of the product $\eta$ of the emission output multiplied by the reception output which must be as high as possible.

2. Description of the Prior Art

There are several known methods for carrying out this separation:

- a first method, which is the simplest, consists in using entirely separate emission and reception pupils. The increase in the size of the output optics that results from the juxtaposition of the two pupils is often a crippling factor for it has many disadvantages. These include:
  - there is a major space requirement;
  - in the case of the use of an aiming and tracking mirror at output of the device, the performance characteristics of the mirror tracking mechanism (stabilization, scan rate, homing and angular accelerations of the beams) decrease as the size of the mirror increases while the optomechanical complexity of the servocontrol system and the cost increase;
  - the vulnerability increases with the space requirement;
  - there is a reduction in the aerodynamism of the carrier;
  - there is a loss of sensitivity and a blind zone inherent in the fact that there is no overlapping between the field demarcated by the divergence of the laser emission and the reception field, for the place that is looked at is never exactly the place that is illuminated.
- a second method consists in using a 50/50 semi-transparent plate that reflects one of the beams, for example the beam of the laser emitter, and transmits the other, the beam of the laser echo. This approach causes a loss of 50% both in the transmitted light flux and in the received light flux, giving a total loss by a factor 4 ($\eta<25\%$) for the entire balance of the link. This is unacceptable for most applications.
- a third method consists of the use, at reception, of a "perforated" optical system whose pupil is deprived of a central surface reserved for the pupil of the emission optics. The losses caused in reception by this shutting off are equal to the ratio between the surface area of the reception pupil and the shut-off surface area. This approach gives rise to optical deterioration resulting in a reduction of the modulation transfer function. But, above all, this method must be ruled out when the pupil of the emission optical system is big. This is so when the values of divergence of the emission laser are small and the wavelengths are big. In the far infra-red range (8–12 $\mu$m band), it is thus common to encounter an emission pupil that is equal to the reception pupil. This makes this third approach unusable.
- a fourth method consists in separating the emission and reception beams by polarization. This can be done by using a transparent plate at the Brewster angle of incidence followed by a quarter-wave plate with a thickness $\lambda/4$. The emission laser beam which is linearly-polarized at the outset crosses the transparent plate at the Brewster angle of incidence which is directed so that its plane of incidence contains the direction of polarization of the emission laser beam, then the quarter-wave plate which converts its linear polarization into a circular polarization. After reflection without depolarization on the scene, the laser echo returns with a circular polarization, makes a reverse crossing of the quarter-wave plate which converts its circular polarization into a linear polarization orthogonal to that of the emission laser, and is reflected on the transparent plate at the Brewster angle of incidence. This separates it from the emission beam. This approach has various disadvantages. First of all, the separation obtained is not multispectral but is limited to a narrow frequency band because of the use of the quarter-wave plate. This disadvantage is particularly awkward for systems of laser countermeasures which may require intraband and multi-band tuning ability. Moreover, a depolarization of the explored scene could cause major losses in reception since only the circularly-polarized component of the laser echo is detected. Moreover, the optical components needed are costly.

The present invention is aimed at overcoming the above-mentioned disadvantages and obtaining the highest possible levels of emission output and reception output at the lowest possible cost.

SUMMARY OF THE INVENTION

An object of the invention is a monostatic pulsed-radiation LIDAR system with combined emission and reception pupils, comprising a laser emitter that generates a pulsed light radiation for the illumination of a scene to be explored, a photodetector-based receiver analyzing the luminous echoes backscattered by the scene and an optical separator separating the optical path of the luminous echoes backscattered by the scene from the optical path of the pulsed light radiation from the laser emitter so as to make only the luminous echoes that are backscattered by the scene reach the input of the receiver. A specific characteristic of this LIDAR system is that its optical separator is a component that deflects an incident light beam in different directions depending on whether it transmits this light beam or reflects it, the coefficient of reflection or the coefficient of transmission of this component varying as a function of the energy density of said incident light beam.

Advantageously, the optical separator has a coefficient of reflection that increases with the energy density of an incident light beam. It deflects the light radiation from the laser emitter by reflection so as to guide it from the laser emitter, where it had followed a path distinct from that of the backscattered echoes, up to its exit from the LIDAR system where it starts following a common path with the backscattered echoes. On the other hand, it allows itself to be crossed by the backscattered echoes that had followed a common path with the light radiation from the laser emitter from the time of their entry into the LIDAR system, to direct them along a path distinct from that of the light radiation from the laser emitter leading to the photodetector of the receiver.

Advantageously, the optical separator comprises a thin layer of vanadium dioxide deposited on a transparent germanium plate.

Advantageously, the optical separator comprises a suspension of carbon particles in liquid ethanol imprisoned between two transparent plates made of glass.

Through the variation of the coefficient of reflection or coefficient of transmission of the optical separator, depending on the presence or absence on its surface of light pulses of high energy density from the laser emitter, it is possible, in emission and reception at the pulsed-radiation monostatic LIDAR system which incorporates this separator, to obtain luminous outputs of over 50% which are therefore more advantageous than those resulting from the use of an optical semi-transparent plate separator while, at the same time, preserving the advantages of separation with a very broad spectral band and a superimposition of the emission and reception pupils without any central shutting of this reception pupil.

BRIEF DESCRIPTION OF THE DRAWING

Other features and advantages of the invention shall appear here below from the following description of an exemplary embodiment of the invention. This description shall be made with reference to the drawing wherein.

MORE DETAILED DESCRIPTION

Figure 1:
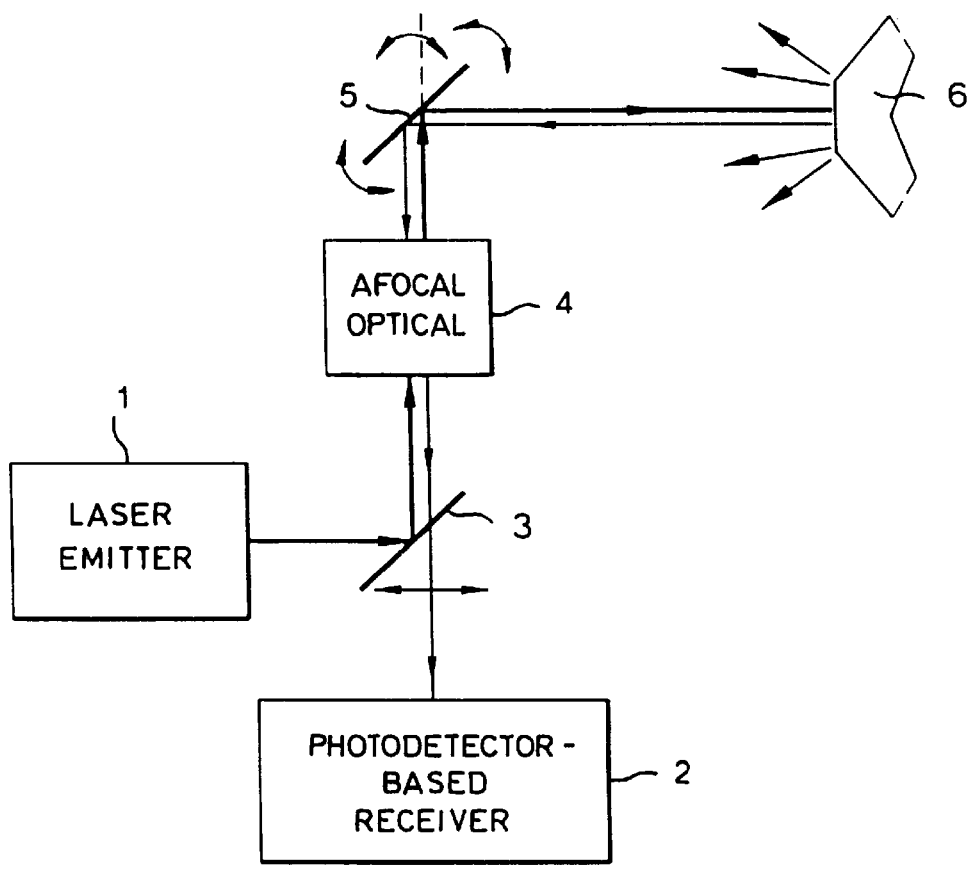
FIG. 1 is a block diagram of a pulsed-radiation monostatic LIDAR system.

FIG. 1 shows the main elements of a pulsed-radiation monostatic LIDAR system. This LIDAR system comprises a pulsed-radiation laser emitter 1 and a photodetector-based receiver 2 that are positioned behind an optical separator 3 bringing together their optical paths and then, on the optical path common to the light beam emitted by the laser emitter 1 and the light beam received by the photodetector of the receiver 2, an afocal optical device 4 designed to collimate the beams and a mobile addressing mirror 5 by which the scene to be explored is scanned. This scene to be explored is represented in FIG. 1 by a target 6. In addition to these main elements, a pulsed-radiation monostatic LIDAR system may include other beam-shaping or beam-scanning optical devices positioned at output after the addressing mirror 5 or inserted between the photodetector-based receiver 2 and the optical separator 3.

The pulsed radiation from the laser emitter 1 reaches the optical separator 3 which directs it through the afocal optical system 4 to the addressing mirror 5 which aims it at a target 6. The luminous echo backscattered by the target 6 follows a reverse path. It is picked up by the addressing mirror 5, crosses the afocal optical system 4 in the reverse direction and reaches the optical separator 3 which directs it towards the photodetector of the receiver 2. By imposing a line-and-frame scanning motion on the addressing mirror 5, it is possible to obtain an image of the scene to be explored.

The optical separator 3 uses reflection and the transmission on or through a plate to combine the pulsed radiation of the laser emitter 1 with the luminous echoes backscattered by the target in the afocal optical unit 4 before this pulsed radiation is aimed by the addressing mirror 5 and to separate the luminous echoes backscattered by the target from the pulsed radiation of the laser after these echoes have passed through the addressing mirror 5 and the afocal optical system 4. The reflection on the plate is used to deflect the pulsed radiation from the laser emitter whereas the luminous echoes backscattered by the target are transmitted without deflection to the photodetector of the receiver 2. It can be seen that, with the arrangement chosen, there can be no leakage of radiation from the laser emitter 1 into the photodetector of the receiver 2 for the portion of the radiation of the laser emitter 1 which manages to cross the plate follows a trajectory at 90° with respect to the photodetector of the receiver 2. The coefficient of reflection or the coefficient of transmission of the plate of the optical separator 3 varies according to the energy density of the incident light beam. Beyond a threshold $S_0$ of energy density, the coefficient of reflection is the maximum. This enables the separator to reflect the pulsed radiation from the laser emitter whose peak power is great. Below this threshold $S_0$, it is the coefficient of transmission that is the maximum so that the echoes backscattered by the target whose energy density is very low arrive at the photodetector of the receiver 2 between the pulses of the pulsed radiation from the laser emitter 1. They do so on condition that the variations of the coefficients of reflection and transmission occur quickly, within a period of time that is smaller than the echo return time.

An optical separator of this kind is useful as compared with a standard optical separator with semi-transparent plate provided that the maximum value of the coefficient of reflection beyond the threshold of energy density $S_0$ exceeds 0,5 and provided that the maximum value of the coefficient of transmission below the threshold $S_0$ of energy density exceeds 0,5.

For an idea of the sizes involved, we might take the example of a LIDAR system working in the mean infra-red band corresponding to the atmospheric window 8–12 μm. A LIDAR system of this kind can be used for laser countermeasures, the detection of chemical agents such as atmospheric pollutants, telemetry or missile guidance. It would have been equally possible to choose another spectral band or even several spectral bands but this one is particularly valuable because of its many applications.

The required range of such a device may be greater than 10 km with a field of aim of the illumination beam equal to several tens of degrees in in terms of both elevation angle and relative bearing, this field moreover having to be covered with homing or angular tracking speeds of several radians per second. Furthermore this equipment must be capable of making emission so that it can be tuned, at least for applications relating to the detection of chemical agents and to laser countermeasures, in the thermal band between 8 and 12 μm with a divergence generally lower than one milliradian. To maintain these performance characteristics, a typical total divergence of 0,3 mrad and a reception pupil of approximately 130 mm are chosen. Assuming that the laser beam has a divergence corresponding to twice the diffraction limit, the emission pupil must have a size of approximately 130 mm, so that the sizes of the emission and reception pupils are very close to each other.

By way of an indication, among the standard methods of separation mentioned here above, the most appropriate is the one having distinct emission and reception pupils. For the addressing mirror, this method entails dimensions of 30 cm by 40 cm when this mirror is used in a 1:1 configuration, i.e. when it rotates by the same angle as the beam, and it entails even greater dimensions when it is used in a 1:2 configuration, i.e. when it rotates by an angle half that of the beam. These dimensions of the addressing mirror are, in most cases of use, incompatible with the required performance characteristics of this mirror (control, optical quality, etc.) and with the resulting space requirement.

It is proposed here to look again at the drawing of FIG. 1, with combined emission and reception pupils, and an optical separator working by reflection and transmission. The coefficient of reflection R or coefficient of transmission T of this optical separator varies with the energy density of the incident beam. The coefficient of reflection R is higher than 0,5 for an incident beam having an energy density above a threshold $S_0$, and the coefficient of transmission T is higher than 0,5 in the other cases.

With a laser emitter generating a pulsed light beam with a diameter of 5 mm and an impulse energy of 100 mJ over a duration of 10 ns at 10 $\mu$s, the fluence of the radiation obtained on the optical separator assumed to be tilted at 45° is approximately 350 mJ/cm2. It is thus possible to choose an energy density threshold $S_0$ of about 300 mJ/cm2 over a duration of 10 ns at 10 $\mu$s so that the optical separator is reflective whenever a light pulse reaches it from the laser emitter and so that it is transparent to the backscattered laser echoes that reach it between the light pulses from the laser emitter and that have an energy density lower than the energy threshold $S_0$ by several orders of magnitude.

Figure 2:
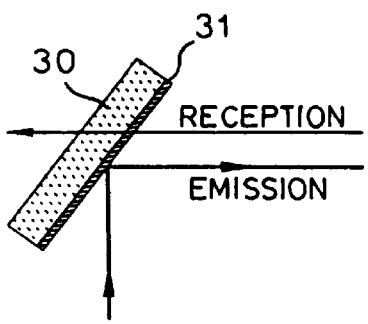
FIGS. 2 and 3 are examples of optical separators according to the invention that can be used in the drawing of FIG. 1.

FIG. 2 gives an example of an optical separator of this kind. This optical separator is formed by a germanium plate 30 transparent to infra-red radiation in the 8–12 $\mu$m band, covered with a vanadium dioxide ($VO_2$) layer 31. The vanadium dioxide layer has the particular characteristic of showing a change in state with an abrupt transition in the vicinity of a temperature of 68° C. Below this temperature, it is semiconductive and transparent and, above this temperature, it becomes metallic and reflective. Details on the way in which it is obtained and its properties can be found in the article by D. P. Partlow, S. R. Gurkovich, K. C. Radford, and L. J. Denes, "Switchable Vanadium Oxide Films By A Sol-Gel Process." in J. Appl Phys. 70 (1), 1 Jul. 1991. Typically, with a vanadium dioxide layer of 0,5 $\mu$m with anti-reflecting treatment deposited on a germanium plate, there is obtained a coefficient of transmission T of 70% in the infra-red and a coefficient of reflection R that is null under weak conditions of illumination and at ambient temperature, whereas the coefficient of transmission falls and that of reflectivity increases beyond 60% as soon as the density of luminous energy exceeds $S_0$. The transition from a strong coefficient of transmission to a strong coefficient of reflection and vice versa, under the effect of a pulsed laser beam, is achieved in a very short time as compared with the duration of the laser pulse. After the passage of the emission pulse, the reverse transition occurs in a duration smaller than one microsecond. This brevity of the transition is compatible with an application to the separation of the optical emission and reception paths of a pulsed LIDAR system.

Figure 3:
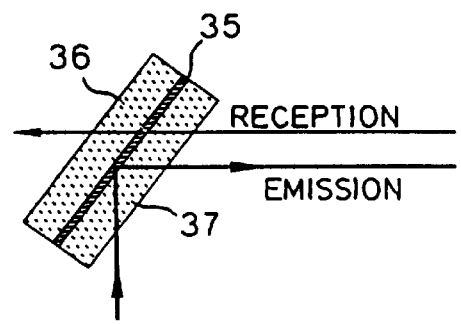

FIG. 3 gives another example of a usable optical separator. This separator is constituted by a veil of carbon particles suspended in a liquid ethanol bath 35 imprisoned between two transparent plates 36, 37 made of glass. For an incident luminous flux with low energy density, the layer of carbon particles suspended in ethanol has a coefficient of transmission close to 1. But as soon as the incident luminous flux exceeds a certain energy density, the carbon particles are ionized and locally form a microplasma that leads to a phenomenon of cavitation in ethanol causing the appearance of small bubbles of vapor modifying the coefficient of reflection. The coefficient of reflection increases in a very great proportion to the point of making the device completely reflective when it is seen at a certain incidence. The passage of the veil of carbon particles suspended in liquid ethanol from a high coefficient of transmission to a high coefficient of reflection and vice versa, under the effect of a pulsed laser radiation at high energy density, is very short as compared with the duration of the emitted laser impulse. This brevity is compatible with an application to the separation of the optical transmission and reception channels of a pulsed LIDAR system. For more details on the optical properties of this kind of a veil of carbon particles suspended in liquid ethanol, reference may be made to the article by C M. Lawson and R. R. Michael, "Non-linear Reflection At A Dielectric-Carbon Suspension Interface: Macroscopic Theory And Experiment." Appl. Phys. Lett. 64 (16), 18 Apr. 1994.

The pulsed-radiation monostatic LIDAR system, equipped with an optical separator with a coefficient of reflection or a coefficient of transmission that is variable as a function of the energy density of the incident light radiation, such as that which has been just described, has the advantage of having combined emission and reception pupils without the central shutting of the reception pupil. This enables the use of a small-sized addressing mirror to aim the transmitted beam and pick up the backscattered echoes, hence an addressing mirror that is compact and highly agile. Moreover, this LIDAR system can function in a very broad spectral band (typically of 0,3 $\mu$m to 12 $\mu$m) and has a simple and inexpensive optical architecture, that is easy to adjust, with low-intensity parasitic reflections.

What is claimed is:

1. A monostatic pulsed-radiation LIDAR system with combined emission and reception pupils, comprising a laser emitter that generates a pulsed light radiation for the illumination of a scene to be explored, a photodetector-based receiver analyzing the luminous echoes backscattered by the scene and an optical separator separating the optical path of the luminous echoes backscattered by the scene from the optical path of the pulsed light radiation from the laser emitter so as to make only the luminous echoes that are backscattered by the scene reach the input of the receiver, wherein said optical separator is a component that deflects an incident light beam in different directions depending on whether it transmits this light beam or reflects it, the coefficient of reflection or the coefficient of transmission of this component varying as a function of the energy density of said incident light beam.

2. A LIDAR system according to claim 1, wherein said optical separator has a coefficient of reflection that increases with the energy density of an incident light beam.

3. A LIDAR system according to claim 2, wherein said optical separator comprises a thin layer of vanadium dioxide $VO_2$ deposited on a transparent plate.

4. A LIDAR system according to claim 3, wherein said transparent plate is made of germanium.

5. A LIDAR system according to claim 3, wherein said layer of vanadium dioxide $VO_2$ has a thickness of about 0,5 $\mu$m.

6. A LIDAR system according to claim 2, wherein said optical separator comprises a suspension of carbon particles in liquid ethanol imprisoned between two transparent plates made of glass.

* * * * *